US009669788B2

(12) United States Patent
Lannen et al.

(10) Patent No.: US 9,669,788 B2
(45) Date of Patent: Jun. 6, 2017

(54) KNEE AIRBAG FOR MOTOR VEHICLE

(71) Applicant: GM Global Technology Operations LLC, Detroit, MI (US)

(72) Inventors: Richard J. Lannen, Royal Oak, MI (US); David J. Gorman, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/505,805

(22) Filed: Oct. 3, 2014

(65) Prior Publication Data

US 2016/0096500 A1   Apr. 7, 2016

(51) Int. Cl.
  *B60R 21/206*   (2011.01)
  *B60R 21/216*   (2011.01)
  *B60R 21/00*    (2006.01)

(52) U.S. Cl.
  CPC .......... *B60R 21/206* (2013.01); *B60R 21/216* (2013.01); *B60R 2021/0051* (2013.01)

(58) Field of Classification Search
  CPC combination set(s) only.
  See application file for complete search history.

(56) References Cited

U.S. PATENT DOCUMENTS

| 3,618,978 | A | * | 11/1971 | Klove, Jr. | B60R 21/206 206/522 |
| 3,951,427 | A | * | 4/1976 | Wilfert | 280/732 |
| 4,032,175 | A | * | 6/1977 | Aibe | B60R 21/045 188/377 |
| 4,061,365 | A | * | 12/1977 | Nagano | B60R 22/06 180/270 |
| 4,291,899 | A | * | 9/1981 | Muramoto | B60R 22/04 280/751 |
| 5,072,967 | A | * | 12/1991 | Batchelder et al. | 280/732 |
| 5,385,366 | A | * | 1/1995 | Frank et al. | 280/728.3 |
| 6,053,527 | A | * | 4/2000 | Gans et al. | 280/728.3 |
| 6,338,501 | B1 | * | 1/2002 | Heilig et al. | 280/753 |
| 6,464,255 | B1 | * | 10/2002 | Preisler et al. | 280/752 |
| 6,471,242 | B2 | * | 10/2002 | Schneider | 280/732 |
| 6,533,312 | B1 | * | 3/2003 | Labrie et al. | 280/728.2 |
| 7,175,195 | B2 | * | 2/2007 | Morita | 280/730.1 |
| 7,641,223 | B2 | * | 1/2010 | Knowlden | 280/728.3 |
| 7,758,069 | B2 | * | 7/2010 | Enders | 280/732 |
| 7,766,374 | B2 | * | 8/2010 | Abele et al. | 280/730.1 |
| 7,798,517 | B2 | * | 9/2010 | Ishida | 280/728.2 |
| 7,798,521 | B2 | * | 9/2010 | Bito | 280/730.1 |
| 7,963,550 | B2 | * | 6/2011 | Hong et al. | 280/730.1 |
| 8,292,322 | B2 | * | 10/2012 | Thomas | 280/728.2 |
| 8,297,650 | B2 | * | 10/2012 | Enders | 280/730.1 |
| 8,360,464 | B2 | * | 1/2013 | Enders | 280/730.1 |
| 8,393,636 | B2 | * | 3/2013 | Tanaka et al. | 280/730.1 |
| 8,444,177 | B2 | * | 5/2013 | Wallat et al. | 280/730.2 |
| 8,500,160 | B2 | * | 8/2013 | Lee | 280/730.1 |
| 8,500,161 | B2 | * | 8/2013 | Chavez | 280/730.1 |

(Continued)

FOREIGN PATENT DOCUMENTS

DE   19946477 B4 *  9/2010
JP   2003034213 A *  2/2003

(Continued)

*Primary Examiner* — Darlene P Condra
(74) *Attorney, Agent, or Firm* — BrooksGroup

(57) ABSTRACT

A number of variations may include a knee airbag mounted on a dash panel.

14 Claims, 3 Drawing Sheets

(56) References Cited

U.S. PATENT DOCUMENTS

| | | | |
|---|---|---|---|
| 8,540,276 B2* | 9/2013 | Schneider et al. | 280/730.1 |
| 8,641,082 B2* | 2/2014 | Vigeant et al. | 280/728.2 |
| 8,657,328 B2* | 2/2014 | Ory | 280/728.3 |
| 8,696,019 B2* | 4/2014 | Chavez et al. | 280/730.1 |
| 8,746,732 B1* | 6/2014 | Kutchey et al. | 280/728.2 |
| 8,770,617 B2* | 7/2014 | Abele et al. | 280/730.1 |
| 8,814,201 B2* | 8/2014 | Webber | 280/730.1 |
| 8,919,811 B2* | 12/2014 | Langer et al. | 280/728.3 |
| 2006/0022440 A1* | 2/2006 | Umehara | 280/730.1 |
| 2009/0079170 A1* | 3/2009 | Bito | B60R 7/06 280/730.1 |
| 2009/0134611 A1* | 5/2009 | Wigger | B60R 21/231 280/730.1 |
| 2009/0212541 A1* | 8/2009 | Wallat | B60R 21/206 280/730.2 |
| 2013/0087006 A1* | 4/2013 | Ohtsubo | B60R 13/02 74/493 |
| 2013/0249201 A1* | 9/2013 | Fujiwara | B60R 21/045 280/752 |
| 2013/0270802 A1* | 10/2013 | Langer | B60R 21/2165 280/728.3 |
| 2014/0049026 A1* | 2/2014 | Webber | B60R 21/206 280/730.1 |
| 2015/0091276 A1* | 4/2015 | Ando | B60R 21/206 280/728.3 |
| 2015/0115580 A1* | 4/2015 | Gould | B60R 21/2176 280/730.1 |
| 2015/0225580 A1* | 8/2015 | Gameiro | C09D 11/08 525/54.44 |
| 2015/0266445 A1* | 9/2015 | Kojima | B60R 21/206 280/728.2 |
| 2015/0291120 A1* | 10/2015 | Kim | B60R 21/215 280/728.2 |
| 2016/0244016 A1* | 8/2016 | Takeshita | B60R 21/203 |

FOREIGN PATENT DOCUMENTS

| | | |
|---|---|---|
| JP | 2011207417 A * | 10/2011 |
| WO | WO 2012126608 A1 * | 9/2012 |

* cited by examiner

KNEE AIRBAG FOR MOTOR VEHICLE

TECHNICAL FIELD

The field to which the disclosure generally relates is airbags.

BACKGROUND

Motor vehicles may include an airbag for restraining the occupant.

SUMMARY OF ILLUSTRATIVE VARIATIONS

A number of variations may include a knee airbag mounted on a dash panel.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application or uses.

Figure 1:
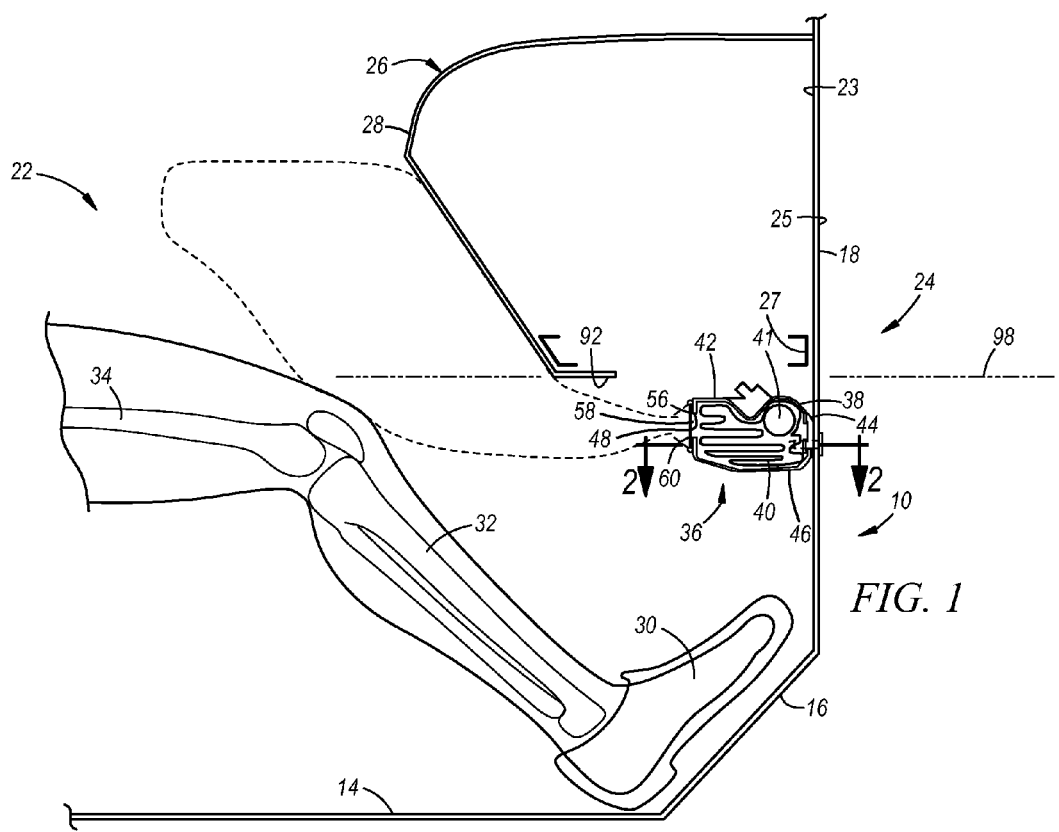
FIG. 1 is a side elevation view of a vehicle interior showing an airbag according to a number of variations.
Figure 2:
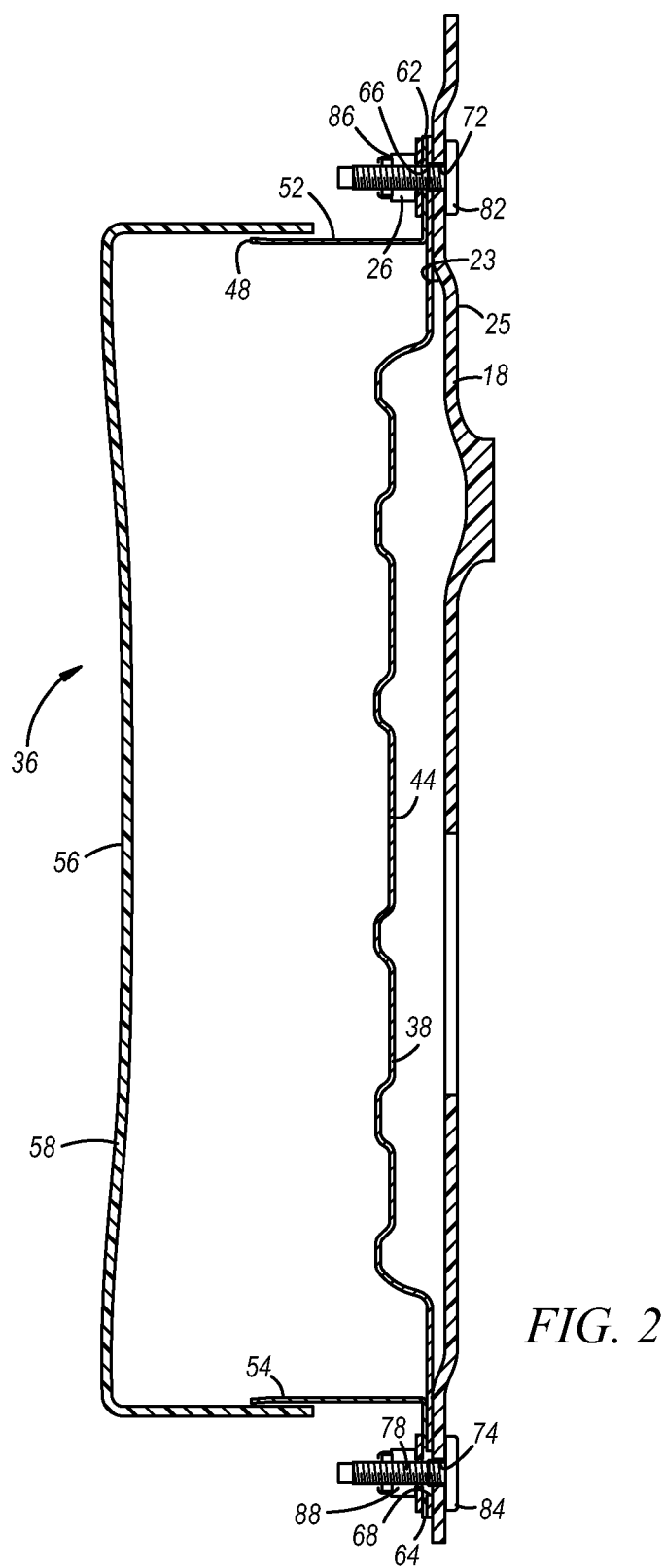
FIG. 2 shows a top view of an airbag of FIG. 1.

A number of variations are illustrated in FIGS. 1 and 2, which may include a body panel 10 of a vehicle and may be comprised of either a single panel or one or more panels of metal or other material that are joined together and may provide a floor pan 14, a toe panel 16, and a dash panel 18. The dash panel 18 may be generally vertical and form a bulkhead separating a passenger compartment 22 from an engine or front compartment 24. The dash panel 18 may have a passenger compartment side 23 and an engine compartment side 25.

An instrument panel assembly 26 may be mounted on the dash panel 18 or other vehicle body structure, and may include components such as a heating and air conditioning system, a glove box, and an upper torso airbag for restraining an upper torso of an occupant. The instrument panel assembly 26 may include a cover panel 28 which supports and conceals the components and may have an internal framework which may include a front mounting rail or bracket 27 that may be attached to dash panel 18 by suitable fasteners at one or more places. The instrument panel assembly, including its cover panel 28, the components, and the mounting bracket 27 may be sub assembled as a unit and then carried to the vehicle for attachment to the dash panel 18 by the fasteners.

As shown in FIG. 1, an occupant is seated in the passenger compartment 22, with a foot 30 resting on the toe panel 16, a lower leg 32 spaced rearward from the instrument panel assembly 26, and a thigh 34 resting on a vehicle seat.

As seen in FIG. 1, a knee airbag module, generally indicated at 36, may be mounted on the dash panel 18. The airbag module 36 may include a housing 38, an inflator 41, and a folded-up airbag 40 that is housed within the housing 38. The housing 38 may include a top wall 42, a front wall 44, a bottom wall 46, and a rearward facing opening 48 through which the folded airbag 40 will deploy. The housing 38 may also have end walls 52 and 54 as shown in FIG. 2. The opening 48 may be closed by a door or cover 56, which may comprise upper and lower doors 58 and 60. Upon activation of the inflator 41, the airbag 40 will inflate and deploy through the opening 48 and force open the upper and lower doors 58 and 60. The airbag 40 will inflate to its inflated position shown in phantom lines in FIG. 1 to restrain and cushion the occupant.

FIG. 2 shows a top view of the airbag module 36 of FIG. 1. The front wall 44 of the housing 38 may have flanges 62 and 64 that extend out from the housing 38 and engage the dash panel 18. The flange 62 may have a hole 66 and the flange 64 may have a hole 68. Holes 72 and 74 may be provided in the dash panel 18 to align with the holes 66 and 68 of the flanges 62 and 64. As seen in FIG. 2, studs 76 and 78, which may be threaded, may be inserted through the holes 72 and 74 of the dash panel 18 from the engine compartment side 25 of the dash panel 18 and have heads 82 and 84 that may seat against the engine compartment side 25 of the dash panel 18. After the housing 38 has been seated over the studs 76 and 78 that are projecting from the dash panel 18, fasteners, which may be nuts 86 and 88, may be installed on the studs 76 and 78. Although FIG. 2 shows two fasteners, additional fasteners may be employed.

As seen in FIG. 1, the airbag module 36 may be mounted on the dash panel 18 immediately beneath the undersurface 92 of the instrument panel assembly 26 and may be mounted directly on the dash panel 18 independently of the instrument panel assembly 26. The airbag module 36 may be mounted just beneath the front mounting bracket 27 of the instrument panel assembly to the dash panel 18.

In many vehicles the underside of the instrument panel assembly 26 may be relatively open rather than sealed or closed off, in order to facilitate access to the interior components of the instrument panel assembly 26 to permit repair service from beneath. Thus, the undersurface 92 of the instrument panel assembly 26 may be defined as a plane at elevation 98 that extends horizontally from a lowest part of the various structures such as glove box, heater and air conditioning components, and the associated structural part such as frames and brackets that make up the instrument panel assembly 26. The airbag module 36 may be mounted on the dash panel 18 above the toe panel 16 and the occupant feet 30 so as to minimize conflicts with occupant comfort. The airbag module 36 may be mounted with its opening 48 generally at or below the plane at elevation 98. The airbag module 36 may be mounted at or below the front mounting rail 27, and above the toe panel 16 and occupant foot position.

By locating the airbag module 36 as described and shown, the airbag module 36 is mounted within the passenger compartment 22, independently of the instrument panel assembly 26 and not mounted within the instrument panel assembly 26, and can be removed, replaced and serviced without complication. As seen in FIG. 1, the rearward facing opening 48 through which the airbag 40 will deploy is located at an elevation even with or below the elevation 98 of the undersurface 92 of the instrument panel assembly, so that, upon inflation of the airbag 40 to the inflated position shown in phantom lines, the deployment of the airbag 40 will proceed without engaging or dislodging or upsetting the parts of the instrument panel assembly 26 that would need to be repaired and replaced if the airbag module 36 had been somehow mounted within the instrument panel assembly 26. Rather, after deployment, there is easy access to the airbag module 36 by removing the nuts 86 and 88 so that the airbag module 36 can removed from its attachment to the dash panel 18, and can be repaired or replaced.

Figure 3:
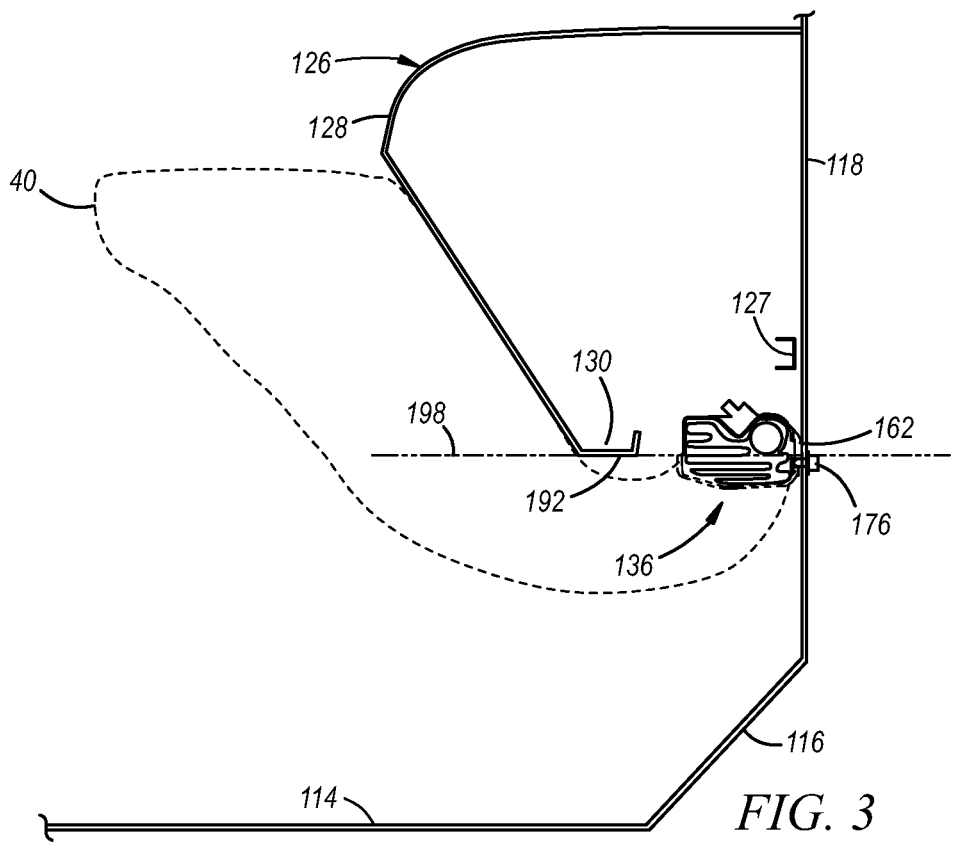
FIG. 3 shows another airbag according to a number of variations.
Figure 4:
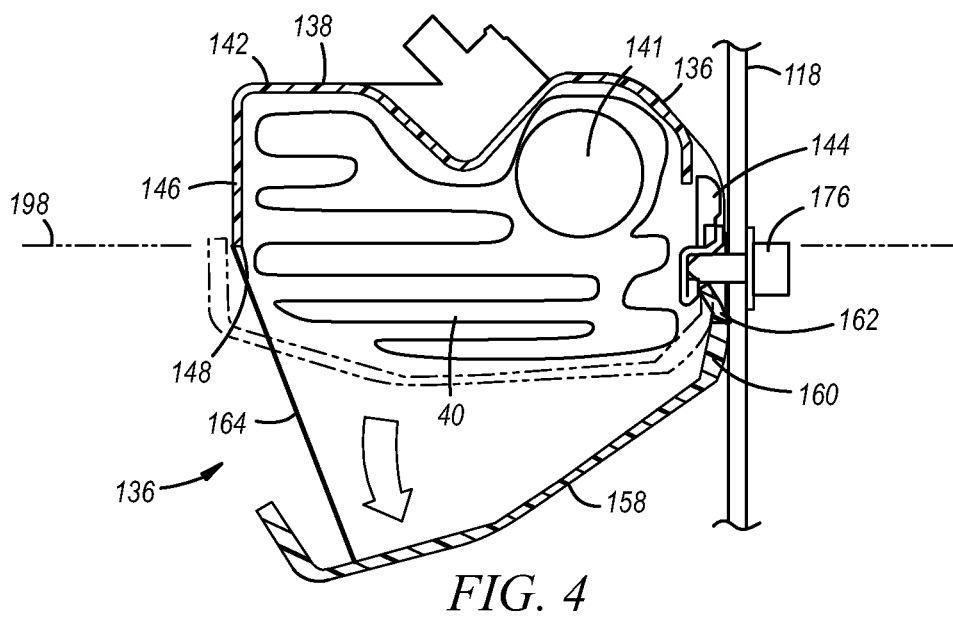
FIG. 4 shows an enlarged view of a portion of FIG. 3.

Additional variations are disclosed in FIGS. 3 and 4. FIG. 3 is a side elevation view of a vehicle having floor pan 114, toe panel 116 and dash panel 118. Instrument panel assembly 126 has an instrument panel mounting bracket 127 which may be attached to a dash panel 118. The instrument panel assembly 126 includes a lower hanging rear portion 130, which may be desired, for example, to house an enlarged glove compartment.

An airbag module 136 may be mounted on the dash panel 118. FIG. 4 is an enlargement of the airbag module 136 of FIG. 3 and shows that the airbag module may have a housing 138, a folded airbag 40 and an inflator 141. The housing 138 may be made of metal or other material and includes a top wall 142 a front wall 144 and a rear wall 146. These walls, together with end walls, not shown, define a downwardly facing opening 148 through which the airbag 40 may inflate and deploy upon inflation thereof by energization of the inflator 141. The airbag module 136 has a door 158 that is attached to the housing 138 and normally closes off the downwardly facing opening 148 to protect and conceal the folded airbag 40. As seen in FIG. 4, the door 158 may be hingedly mounted at its forward end by a hinge 160 which allows the door 158 to pivot downwardly to its position of FIG. 4 upon inflation of the airbag 40. FIG. 4 also shows that the airbag module 136 can have a tether strap 164, which will limit the opening movement of the door 158, so that the door 158 may in turn direct the path of the inflating airbag 40 more rearwardly toward the occupant's legs rather than deploying the airbag downwardly toward the occupant feet.

As seen in FIGS. 3 and 4, the front wall 144 of the airbag housing 138 may have one or more mounting flanges 162, which may be attached to the dash panel 118 by fasteners which may be bolts 176 that thread in to integrally formed nuts carried by the mounting flanges 162.

As seen in FIGS. 3-4, the airbag module 136 may be mounted on the dash panel 118 just below the instrument panel mounting rail 127. Furthermore as seen in FIG. 3, the airbag 40 (FIG. 4) is able to successfully deploy in the downward direction initially, and then deploy rearwardly around the lower hanging portion 130 of the instrument panel assembly 126 to its deployed and fully inflated position of FIG. 3 in which the occupant's legs and knees will be effectively restrained and cushioned. As seen in FIG. 4, the downward facing opening 148 through which the airbag 40 will deploy is defined by the lower edges of the rear wall 146 of housing 138. The opening 148 is located at an elevation even with or below the elevation 198 of the undersurface 192 of the instrument panel assembly 126, so that, upon inflation of the airbag 40 to the inflated position shown in phantom lines, the deployment of the airbag 40 will proceed without forcibly engaging and dislodging or upsetting the parts of the instrument panel assembly 126 that would need to be repaired and replaced if the airbag module 136 had been somehow mounted within the instrument panel assembly 126. After deployment, there is easy access to the airbag module 36 by removing the fastener such as bolts 176 so that the airbag module 136 can be removed from its attachment to the dash panel 18, and can be repaired or replaced.

Thus, in FIG. 3, the body of the airbag module 136 may be mounted on the dash panel 118 above the lowest most part 130 of the instrument panel, but the opening 148 is at or below the elevation 198. The airbag module 136 is mounted directly on the dash panel 118 and independent from the structures of the instrument panel assembly 126. Thus, as in the earlier described variations of FIGS. 1 and 2, the airbag module 136 can be easily replaced or repaired without disassembly of the instrument panel assembly 126. Furthermore upon inflation of the airbag module 136 the airbag 40 is successfully inflated and deployed without causing any disruption of components of the instrument panel assembly 126, including the lowest hanging part 130, such as would otherwise result in those vehicles where the airbag module 136 is mounted as a part of and directly on the instrument panel assembly 126.

Many variations are shown and described. As shown the doors may be a one piece door or a pair of doors. One or more tethers can limit the movement of the doors to assist in directing the inflation of the airbag.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a knee airbag for a motor vehicle which may include a dash panel separating a passenger compartment and an engine or frontal compartment; an instrument panel assembly mounted on the dash panel; and an airbag module having a housing enclosing an inflatable airbag, said housing being mounted directly on the dash panel within the passenger compartment and independent of the instrument panel assembly.

Variation 2 may include the knee airbag of Variation 1 wherein the housing has at least one mounting flange engaging the dash panel and attached to the dash panel by at least one fastener.

Variation 3. may include the knee airbag of Variation 1-2 wherein the housing is attached to the dash panel by a fastener and the housing has an opening through which the airbag may deploy from the housing during inflation thereof, said opening being generally at or below the underside of the instrument panel assembly so that the airbag inflates and deploys without disrupting the instrument panel assembly.

Variation 4 may include the knee airbag of Variations 1-3 wherein the opening of the housing faces rearward.

Variation 5 may include the knee airbag of Variations 1-4 further comprising the housing having a door closing the housing opening, and the door opening upon inflation of the airbag.

Variation 6 may include the knee airbag of Variations 1-5 further comprising the door having a tether limiting the opening movement of the door so that the door guides the inflation and rearward deployment of the airbag from the opening.

Variation 7 may include the knee airbag of Variations 1-6 wherein the opening of the housing faces downwardly.

Variation 8 may include the knee airbag of Variations 1-7 further comprising the housing having a door closing the housing opening, and the door opening upon inflation of the airbag.

Variation 9 may include the knee airbag of Variations 1-8 wherein the door has a tether limiting the opening movement of the door so that the door guides the inflation of the airbag from the downward facing opening to the rearward toward the occupant.

Variation 10 may include the knee airbag of Variations 1-9 further comprising the housing having an opening through which the airbag may deploy from the housing during inflation thereof, said opening being generally at or below the underside of the instrument panel assembly so that the airbag inflates and deploys without disrupting the instrument panel assembly, a door normally closing the opening and a tether limiting opening movement of the door so that the door guides a deployment of the inflating airbag.

Variation 11 may include the knee airbag for a motor vehicle comprising a dash panel separating a passenger compartment and an engine or frontal compartment; a toe panel below the dash panel for supporting the occupant foot; an instrument panel assembly mounted on the dash panel and having an underside at an elevation above the occupant toe panel; an airbag module having a housing enclosing an inflatable airbag, said housing being mounted directly on the dash panel within the passenger compartment and independent of the instrument panel assembly; and said housing having a downward facing opening through which the airbag may deploy from the housing during inflation thereof, said downward facing opening being generally at or below the elevation of the underside of the instrument panel assembly so that the airbag inflates and deploys without disrupting the instrument panel assembly.

Variation 12 may include the knee airbag of Variation 11 further comprising at least one fastener fastening the housing of the airbag module on the dash panel, the fastener being removable to permit removal of the airbag module from the dash panel.

Variation 13 may include the knee airbag of Variations 11-12 further comprising the housing having a door closing the downward facing opening, and the door opening upon inflation of the airbag.

Variation 14 may include the knee airbag of Variations 11-13 further comprising the housing having a door that closes the downward facing opening, the door opening upon inflation of the airbag, and the door having a tether limiting the opening movement of the door so that the door guides the inflation and rearward deployment of the airbag from the downward facing opening.

Variation 15 may include a knee airbag for a motor vehicle comprising a dash panel separating a passenger compartment and an engine or frontal compartment; a toe panel below the dash panel for supporting the occupant foot; an instrument panel assembly mounted on the dash panel and having an underside at an elevation above the occupant toe panel; an airbag module having a housing enclosing an inflatable airbag, said housing being mounted directly on the dash panel within the passenger compartment and independent of the instrument panel assembly; and said housing having a downward facing opening through which the airbag may deploy from the housing during inflation thereof, said downward facing opening being generally at or below the elevation of the underside of the instrument panel assembly so that the airbag inflates and deploys without disrupting the instrument panel assembly.

Variation 16 may include the knee airbag of Variations 15 further comprising at least one fastener fastening the housing of the airbag module on the dash panel, the fastener being removable to permit removal of the airbag module from the dash panel.

Variation 17 may include the knee airbag of Variations 15-16 further comprising the housing having a door closing the downward facing opening, and the door opening upon inflation of the airbag.

Variation 18 may include the knee airbag of Variations 15-17 further comprising the housing having a door that closes the downward facing opening, the door opening upon inflation of the airbag, and the door having a tether limiting the opening movement of the door so that the door guides the inflation and rearward deployment of the airbag from the downward facing housing opening.

The above description of select variations within the scope of the invention is merely illustrative in nature and, thus, variations or variants thereof are not to be regarded as a departure from the spirit and scope of the invention.

The invention claimed is:

1. A knee airbag for a motor vehicle comprising:
   a dash panel separating a passenger compartment and an engine or frontal compartment;
   an instrument panel assembly mounted on the dash panel or other body structure and the instrument panel having a free end spaced a distance from the dash panel;
   and an airbag module having a housing enclosing an inflatable airbag, said housing being mounted directly on the dash panel within the passenger compartment and independent of the instrument panel assembly; the housing being attached to the dash panel by at least one fastener and the housing having an opening through which the airbag may deploy from the housing during inflation thereof, said opening being generally at or below the underside of the instrument panel assembly so that the airbag inflates and deploys without disrupting the instrument panel assembly; the housing further having a door closing the housing opening, and the door opening upon inflation of the airbag; and the door having a tether limiting the opening movement of the door so that the door guides the inflation and rearward deployment of the airbag from the opening.

2. The knee airbag of claim 1 further comprising the housing having at least one mounting flange engaging the dash panel and attached to the dash panel by the at least one fastener.

3. The knee airbag of claim 1 wherein the opening of the housing faces rearwardly.

4. The knee airbag of claim 1 wherein the opening of the housing faces downwardly.

5. A knee airbag for a motor vehicle comprising:
   a dash panel separating a passenger compartment and an engine or frontal compartment;
   a toe panel below the dash panel for supporting the occupant foot,
   an instrument panel assembly mounted on the dash panel or other body structure and having an underside at an elevation above the occupant toe panel and the instrument panel having a free end spaced a distance from the dash panel;
   an airbag module having a housing enclosing an inflatable airbag, said housing being mounted directly on the dash panel within the passenger compartment and independent of the instrument panel assembly;
   and said housing having a downward facing opening through which the airbag may deploy from the housing during inflation thereof, said downward facing opening being generally at or below the elevation of the underside of the instrument panel assembly so that the airbag inflates and deploys without disrupting the instrument panel assembly and the housing further having a door closing the housing opening, and the door opening upon inflation of the airbag; and the door having a tether limiting the opening movement of the door so that the door guides the inflation and rearward deployment of the airbag from the opening.

6. The knee airbag of claim 5 further comprising at least one fastener fastening the housing of the airbag module on the dash panel, the fastener being removable to permit removal of the airbag module from the dash panel.

7. A knee airbag for a motor vehicle comprising:
a dash panel separating a passenger compartment and an engine or frontal compartment;
a toe panel below the dash panel for supporting the occupant foot,
an instrument panel assembly mounted on the dash panel or other body structure and overlying a portion of the dash panel and having an underside at an elevation above the occupant toe panel; and the instrument panel assembly having a free end spaced a distance from the dash panel;
an airbag module having a housing enclosing an inflatable airbag, said housing being mounted directly on the dash panel within the passenger compartment and independent of the instrument panel assembly and said housing further comprising a door having a tether;
and said housing having a downward facing opening through which the airbag may deploy from the housing during inflation thereof, said downward facing opening being generally at or below the elevation of the underside of the instrument panel assembly so that the airbag inflates and deploys without disrupting the instrument panel assembly.

8. The knee airbag of claim 7 further comprising at least one fastener fastening the housing of the airbag module on the dash panel, the fastener being removable to permit removal of the airbag module from the dash panel.

9. The knee airbag of claim 7 wherein the door is constructed and arranged to close the downward facing opening, and the door being constructed and arranged to open upon inflation of the airbag.

10. The knee airbag of claim 7 wherein the door is constructed and arranged to close the downward facing opening, the door opening upon inflation of the airbag, and the door having a tether limiting the opening movement of the door so that the door guides the inflation and rearward deployment of the airbag from the downward facing housing opening.

11. A product comprising:
a dash panel separating a passenger compartment and an engine or frontal compartment;
an instrument panel assembly mounted on the dash panel or other body structure and overlying a portion of the dash panel and having an underside at an elevation above the occupant toe panel; and the instrument panel assembly having a free end spaced a distance from the dash panel;
and an airbag module having a housing enclosing an inflatable airbag, said housing being mounted directly on the dash panel within the passenger compartment and independent of the instrument panel assembly;
the housing being attached to the dash panel by a fastener and the housing having an opening through which the airbag may deploy from the housing during inflation thereof, said opening being generally below the underside of the instrument panel assembly so that the airbag inflates and deploys without disrupting the instrument panel assembly.

12. A product comprising:
a dash panel separating a passenger compartment and an engine or frontal compartment;
an instrument panel assembly mounted on the dash panel and overlying a portion of a dash panel, the instrument panel assembly having a free end spaced a distance from the dash panel;
and an airbag module having a housing enclosing an inflatable airbag, said housing being mounted directly on the dash panel within the passenger compartment and independent of the instrument panel assembly and further comprising a door, the door opening upon inflation of the airbag, and the door having a tether limiting the opening movement of the door so that the door guides the inflation and rearward deployment of the airbag from the downward facing opening.

13. A product as set forth in claim 12 further comprising the housing being attached to the dash panel by a fastener and the housing having an opening through which the airbag may deploy from the housing during inflation thereof, said opening being generally at or below the free end of the instrument panel assembly so that the airbag inflates and deploys without disrupting the instrument panel assembly.

14. A product comprising:
a dash panel separating a passenger compartment and an engine or frontal compartment;
a toe panel below the dash panel for supporting the occupant foot,
an instrument panel assembly mounted on the dash panel overlying a portion of the dash panel and having an underside at an elevation above the occupant toe panel; and the instrument panel assembly having a free end spaced a distance from the dash panel;
an airbag module having a housing enclosing an inflatable airbag, said housing being mounted directly on the dash panel within the passenger compartment and independent of the instrument panel assembly;
and said housing having a downward facing opening through which the airbag may deploy from the housing during inflation thereof, said downward facing opening being generally at or below the elevation of the underside of the instrument panel assembly so that the airbag inflates and deploys without disrupting the instrument panel assembly;
the housing being attached to the dash panel by a fastener and the housing having an opening through which the airbag may deploy from the housing during inflation thereof, said opening being generally below the underside of the instrument panel assembly so that the airbag inflates and deploys without disrupting the instrument panel assembly.

* * * * *